E. A. SACKERMAN.
ATTACHMENT ON VEHICLES.
APPLICATION FILED OCT. 17, 1917.
1,266,055.
Patented May 14, 1918.
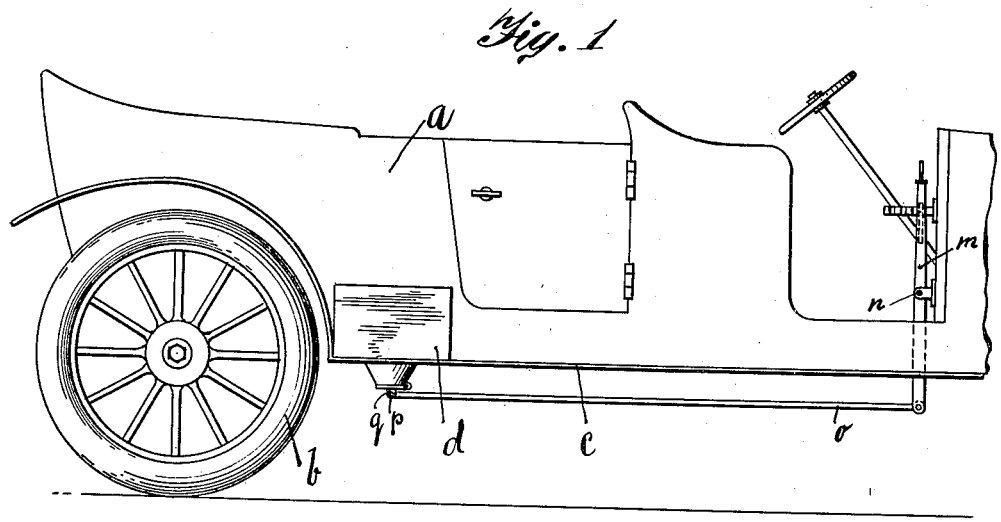
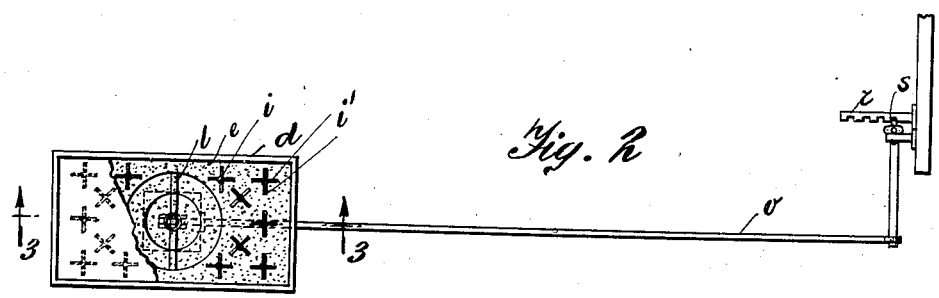
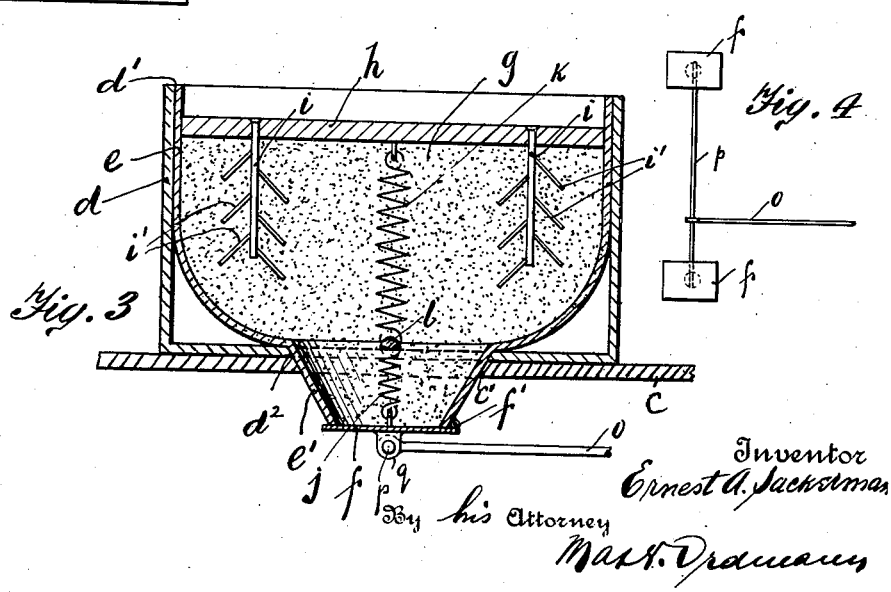
Inventor
Ernest A. Sackerman
By his Attorney

UNITED STATES PATENT OFFICE.

ERNEST A. SACKERMAN, OF HACKENSACK, NEW JERSEY.

ATTACHMENT ON VEHICLES.

1,266,055. Specification of Letters Patent. Patented May 14, 1918.

Application filed October 17, 1917. Serial No. 196,989.

*To all whom it may concern:*

Be it known that I, ERNEST A. SACKERMAN, citizen of the United States, residing at Hackensack, in the county of Bergen and State of New Jersey, have invented certain new and useful Improvements in Attachments on Vehicles, of which the following is a specification.

The present invention relates to vehicles and more particularly to automobiles, and has as one of its main objects to provide means for distributing substances such as sand, gravel or other abrasive or antislipping substances into the path of the vehicle wheels, thereby preventing the skidding of the vehicle. By the use of such substances the hitherto used more or less complicated and expensive devices applied to the wheels will be dispensed with.

With this and other objects in view my invention substantially consists in the provision of a suitable receptacle to be arranged in the vicinity of the wheels and to contain the antislipping substances, means to enable a uniform distribution of the contents of the receptacle, and means for enabling the distribution of the substances from the driver's seat.

My invention further consists in certain novel means for the prevention of agglomeration of the contents within the receptacle.

The same also consists in the combination, arrangement and construction of parts as will hereinafter be more fully explained and set forth in the appended claims.

Reference is had to the accompanying drawing in which similar reference characters denote corresponding parts and in which Figure 1 is a side elevation of an automobile equipped with my new device; Fig. 2 is a top plan view of the device proper, the top of the receptacle being broken away to show the interior thereof; Fig. 3 is an enlarged vertical section on line 3—3 of Fig. 2 of the receptacle and Fig. 4 is a diagrammatic view of the tiltable lids of two receptacles showing their operative connection for the simultaneous operation thereof from the driver's seat.

In the present embodiment of my invention my device is shown as applied to an automobile and the receptacle forming part of the device arranged on the stepboard adjacently the rear wheels of the vehicle. I do not wish however to restrict the use of my device on automobiles nor to its arrangement as shown, since it is obvious that the device can be equally applied to other vehicles and be arranged at any other suitable place, say for instance in the space or box formed below the rear seat of the vehicle.

Referring now in detail to the construction $a$ denotes the automobile, $b$ its rear wheels, and $c$ the stepboard. The device proper consists substantially of a rectangular box $d$, which advantageously may be a wooden box and which in the present example is shown arranged on the stepboard $c$ in the vicinity of the rear wheels $b$ of the vehicle. The box $d$ has an open top $d^1$ and a hole $d^2$ in its bottom. A correspondingly shaped and sized hole $c^1$ is provided in the stepboard $c$ to be in range with said hole $d^2$. Removably fitted in the box $d$ is a hopper shaped inner receptacle $e$ of metal or other suitable material which at its bottom has an extension $e^1$ adapted to project downwardly through the opening $d^2$ of the box $d$ and the opening $c^1$ of the stepboard $c$. The bottom of the extension $e^1$ is open but may be normally closed by a lid $f$ which at the end farthest away from the wheels $b$ is hinged as at $f^1$ or otherwise pivotally secured to it so as to be capable of tilting around a horizontal axis. Sand $g$, gravel or other abrasive or nonslipping substance is stored in the inner receptacle $e$ and normally retained therein by the lid $f$ when the latter is in closed position. The lid is adapted to be operated so as to occupy when open a rearwardly slanting position in order to act as a chute over which the sand or the like dropping out from the receptacle will be discharged toward the wheels and into the path of the latter. According to the arrangement shown in the present example, a separate box $d$ and receptacle $e$ of identical construction is provided on each side of the vehicle to serve one for each wheel.

In order to cause the discharge of the contents from the receptacle $e$ more rapidly than the same would take place were it left to its own gravity, I provide in each receptacle $e$ a weighted or spring actuated plate or disk $h$ which is adapted to rest on the contents of the receptacle and which serves to press the contents toward and when the lid is open through the bottom of the receptacle $e$. This plate or disk is freely vertically movable within the receptacle $e$. To prevent agglomeration of the contents owing to humidity and pressure exerted thereon the plate or disk is provided with a number of downwardly extending members $i$ formed with prongs $i^1$ or the like which engage into the mass and during the descent of the member $i$ are adapted to stir the content loosening it and thereby preventing its agglomeration. The members $i$ and prongs $i^1$ may advantageously be made of resilient material so that when the plate or disk $h$ is approaching the bottom of the receptacle, as the content of the latter is being discharged, the members $i$ and prongs $i^1$ in coming in contact with the walls of the receptacle will bend toward the opening in the bottom thereof and scrape off the sand or the like adhering to the walls. The lid $f$ may be actuated by a spring $j$ which will tend to maintain it in closed position. A spring $k$ may also act on the plate or disk $h$ to pull the same downwardly. Both these springs $j$ and $k$ may be attached to a pin $l$ provided in the receptacle $e$, or instead there may be a single spring connecting the lid $f$ and the disk $h$ so that at the moment the lid is opened the disk $h$ will be pulled downwardly to cause the discharge of the contents.

The manipulation of the lid is accompanied from the driver's seat by means of a hand lever $m$ which is pivoted at $n$ to a fixed part of the vehicle and which at its lower end projects downwardly and outwardly from the vehicle and is pivotally connected to one end of a rod $o$. The opposite end of the rod is connected to an axle $p$ which extends crosswise thereto and is fixed or supported in an eye $q$ projecting from the lid $f$. The rod $p$ may be common for both lids $f$ of the two receptacles so that by the manipulation of the hand lever $m$, the two lids $f, f$ as indicated in Fig. 4 will be tilted simultaneously.

To regulate the extent of opening of the lids, in order to enable the distribution of a larger or smaller quantity, I provide in front of the driver's seat a toothed bar $r$, or the like, with which a pawl $s$ on the hand lever $m$ is adapted to coöperate in well known manner.

It has already been mentioned that instead of arranging the boxes on the stepboards $c$ the same may be conveniently placed below the rear seat of the vehicle, which arrangement will require only slight constructional changes.

Since these and other modifications may be made by those skilled in the art without departing from the principle of my invention, I do not wish to limit myself to the details herein shown and described.

What I claim is:

1. The combination with a vehicle, of means of distributing anti-skidding substances into the path of the wheels of said vehicle, said means comprising a box for said substances having a tiltable lid at its bottom, means for operating said lid from the driver's seat, and means for forcing said substances toward and through the bottom when the lid is open, said means including members for preventing the agglomeration of the contents within the said receptacle.

2. In a vehicle, means for distributing anti-skidding substances into the path of the wheels of said vehicle, said means comprising a receptacle for said substances having a tiltable lid at its bottom, spring actuated means for pressing said substances toward and through the bottom when said lid is open, and means for manipulating said lid from the driver's seat.

3. In a vehicle, means for distributing antiskidding substances into the path of the wheels of the said vehicle, said means comprising a receptacle for said substances having a lid hinged to its bottom, means for operating said lid from the driver's seat, means in said receptacle adapted to constantly press on said substances and to force the latter toward and through the bottom of said receptacle and including ramified members adapted to be embedded in said substances to prevent the agglomeration of the latter.

4. In a vehicle, means for distributing antiskidding substances into the path of the wheels of said vehicle, said means comprising a receptacle for said substances having a lid hinged to its bottom, means for operating said lid from the driver's seat, means in said receptacle adapted to constantly press on said substances and to force the latter toward and through the bottom of said receptacle and including ramified resilient members adapted to be embedded in said substances and to prevent agglomeration thereof.

5. In a vehicle, means for distributing antiskidding substances into the path of the wheels of said vehicle, said means comprising a receptacle for said substances having a lid hinged to its bottom, means for operating said lid from the driver's seat, spring actuated means in said receptacle adapted to constantly press on said substances and to force the latter toward and through the bottom of said receptacle and including ramified resilient members adapted to be embedded in said substances and to prevent agglomeration thereof.

6. In an automobile, means for distributing antiskidding substances into the path of the rear wheels of said automobile, said means comprising a box fixed on the stepboard of the automobile in the vicinity of the rear wheels thereof and having an opening in its bottom, a hopper shaped receptacle removably mounted in said box, and having its open lower end projecting through the said opening in the box and a lid hinged to said open end of said receptacle, means for operating said lid from the driver's seat, a member movably mounted in said inner receptacle and adapted to constantly press on the substances contained therein and means supported from said member and adapted to prevent agglomeration of the substances.

In testimony whereof I affix my signature in presence of two witnesses.

ERNEST A. SACKERMAN.

Witnesses:
 MAX D. ORDMANN,
 ELSIE SCHMID.